United States Patent
Yi

(10) Patent No.: US 10,075,367 B2
(45) Date of Patent: Sep. 11, 2018

(54) APPARATUS AND METHOD FOR ESTABLISHING A REPAIR PATH

(71) Applicant: Telefonaktiebolaget LM Ericsson (publ), Stockholm (SE)

(72) Inventor: Aaron Yi, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 15/126,386

(22) PCT Filed: Apr. 4, 2014

(86) PCT No.: PCT/CN2014/074819
§ 371 (c)(1),
(2) Date: Sep. 15, 2016

(87) PCT Pub. No.: WO2015/149358
PCT Pub. Date: Oct. 8, 2015

(65) Prior Publication Data
US 2017/0126545 A1    May 4, 2017

(51) Int. Cl.
*H04L 12/703* (2013.01)
*H04L 12/707* (2013.01)
(Continued)

(52) U.S. Cl.
CPC .......... *H04L 45/28* (2013.01); *H04L 12/4633* (2013.01); *H04L 45/22* (2013.01); *H04L 45/507* (2013.01)

(58) Field of Classification Search
None
See application file for complete search history.

(56) References Cited

U.S. PATENT DOCUMENTS 9,100,328 B1 * 8/2015 Atlas ............... H04L 45/28
2006/0268682 A1 * 11/2006 Vasseur ............ H04L 41/12
370/216
(Continued)

FOREIGN PATENT DOCUMENTS

CN     101159681 A    4/2008
WO    2009037681 A2   3/2009
WO    2012109912 A1   8/2012

OTHER PUBLICATIONS

Atlas, E. et al., "Basic Specification for IP Fast Reroute: Loop-Free Alternates", Network Working Group Request for Comments: 5286, Sep. 1, 2008, pp. 1-31, IETF.

*Primary Examiner* — Diane Lo
(74) *Attorney, Agent, or Firm* — Coats & Bennett, PLLC

(57) ABSTRACT

A method and apparatus is provided for establishing a repair path between a source node (101) and a destination node (105) in a communication network configured to operate a remote Loop-Free Alternate, LFA, procedure. The method comprises the steps of: prior to detecting a link failure or switchover event associated with a protected link, within a current path between the source node (101) and the destination node (105), performing the steps of: pre-configuring a Point of Local Repair, PLR, node (106) for the protected link (step 301); and pre-configuring a repair tunnel endpoint node (102) for the PLR node (step 303). In response to detecting a link failure or switchover event associated with the protected link, the method comprises the steps of establishing a repair path between the source node and the destination node (step 305), wherein the repair path is routed via the repair routed via the repair tunnel endpoint node (102), and wherein the route of the repair wherein the route of the repair path excludes the PLR node (106) and the protected link.

17 Claims, 17 Drawing Sheets

(51) Int. Cl.
  *H04L 12/46*  (2006.01)
  *H04L 12/723*  (2013.01)

(56) References Cited

U.S. PATENT DOCUMENTS

| | | | |
|---|---|---|---|
| 2007/0011284 A1* | 1/2007 | Le Roux | H04L 45/28 709/223 |
| 2013/0094355 A1 | 4/2013 | Nakash | |
| 2013/0121169 A1* | 5/2013 | Zhao | H04L 43/00 370/242 |
| 2014/0092722 A1 | 4/2014 | Jain et al. | |
| 2014/0280711 A1* | 9/2014 | Asati | H04L 45/28 709/217 |

* cited by examiner

APPARATUS AND METHOD FOR ESTABLISHING A REPAIR PATH

TECHNICAL FIELD

The present invention relates to an apparatus and method for establishing a repair path between a source node and a destination node in a communication network, and in particular a communication network that is configured to operate a remote Loop-Free Alternate, LFA, procedure.

BACKGROUND

Many applications using communication networks, for example Voice over IP (VoIP), are sensitive to traffic loss, such as occurs when a link or router in the communication network fails.

In communication networks a feature known as Loop-Free Alternate (LFA) has been developed to provide a back-up path in the event that a node or link in the communication network becomes faulty or non-operational. LFA effectively performs a form of local repair, whereby a router local to a point of failure is preprogrammed with an alternate next hop, which is activated when a failure is detected. The loop-free local repair is active until a global repair route is activated, for example until a distributed network convergence process completes (this being a form of global repair).

The International Engineering Task Force (IETF) request for comments RFC5286 provides further details of the Basic Specification for IP Fast Reroute: Loop-Free Alternates, and offers a method for calculating loop-free alternates based on a calculation of route inequalities.

In a communication network adopting a LFA mechanism for a protected link, the term "P-space" relates to a set of routers reachable from a specific router without any path (including equal cost path splits) transiting the protected link. The term "Q-space" relates to a set of routers from which a specific router can be reached without any path (including equal cost path splits) transiting the protected link.

An extension to LFA is known as remote LFA (RLFA). Remote LFA is a repair mechanism that provides additional backup connectivity for link failure protection when none can be provided by the basic mechanism. It fills the gap when a link cannot be fully protected by a traditional local LFA neighbour.

When remote LFA is applied for link failure protection, especially in ring based topologies, a Target Label Distribution Protocol (TLDP) session will be generated and stay resident between a Point of Local Repair node (PLR node) and a PQ node. A PQ node is a member of both the extended P-Space and the Q-space (extended P-Space being the union of P-space of the neighbours of a specific router with respect to the protected link). In remote LFA this PQ node is used as a repair tunnel endpoint node.

Instead of switching to another available Label Switched Path (LSP) directly from a source point, packets will first follow the original path to the PLR node, then switch to a PQ node through a pre-calculated backup LSP, as will be described below in relation to FIGS. 1 and 2. The back-and-forth forwarding path has disadvantages such as occupying a portion of available link bandwidth, and increasing the recovery time after a failure, and is thus not an optimal switchover path.

FIG. 1 shows an example of a typical ring based topology comprising seven nodes 101 to 107. If a path is to be established from node 101 to node 105 (node 101 being the source node and node 105 being the destination node in such an example), a shortest path will result in packets entering from node 101 being routed via node 107 and node 106 to node 105.

If a link failure or switchover event (for example because of a degradation of a link) occurs between node 106 and node 105, as shown in FIG. 2, then node 106 will effectively become the Point of Local Repair, i.e. PLR node. The node 106 will set up a targeted LDP (TLDP) session 13 with a repair tunnel endpoint node (the PQ node), this being node 102 in the example of FIG. 2. Further details about how the PQ node is determined may be found in a IETF paper referenced <draft-ietf-rtgwg-remote-lfa-04>. The PLR node is pre-configured before link failure or degradation, as is the PQ node and the TLDP session between the PLR node and the PQ node. This TLDP session needs to be established and the labels processed before the tunnel can be used.

When a link failure occurs the PLR node first needs to swap the original top label stack to the label stack used by the repair tunnel endpoint (PQ node) to the destination, and then push its own label for the repair tunnel endpoint (PQ node). Remote LFAs operating in this manner preserve the benefits of RFC5286, which include simplicity, incremental deployment and good protection coverage.

However, packets entering the source node 101 will continue along the original path to node 106, where they will turn around and follow an opposite side LSP path towards node 101, and then via node 102 to node 103, from node 103 to node 104, and from node 104 to node 105.

The packets take the back-and-forth forwarding path when switchover occurs to another available path, and the packet source node (node 101) does not have any sense of the link failure, since all the switchover procedures are carried out by the PLR node, i.e. node 106 in this example. The unnecessary forwarding direction has the disadvantage of occupying twice the link bandwidth for its back-and-forth behavior, and this waste of bandwidth is increased when there are more nodes between the PLR node (node 106) and the packet source node (node 101).

In addition to such bandwidth disadvantages, another disadvantage is that of LDP convergence time. Known remote LFA switchover mechanisms mainly depend of Interior Gateway Protocol (IGP) convergence, which can take several seconds in a large network.

SUMMARY

It is an aim of the present invention to provide a method and apparatus which obviate or reduce at least one or more of the disadvantages mentioned above.

According to a first aspect of the present invention there is provided a method for establishing a repair path between a source node and a destination node in a communication network configured to operate a remote Loop-Free Alternate, LFA, procedure. The method comprises the steps of: prior to detecting a link failure or switchover event associated with a protected link, within a current path between the source node and the destination node, performing the steps of pre-configuring a Point of Local Repair, PLR, node for the protected link, and pre-configuring a repair tunnel endpoint node for the PLR node. In response to detecting a link failure or switchover event associated with the protected link, the method further comprises the steps of establishing a repair path between the source node and the destination node, wherein the repair path is routed via the repair tunnel endpoint node, and wherein the route of the repair path excludes the PLR node and the protected link.

According to another aspect of the present invention there is provided a method in a Point of Local Repair, PLR, node for establishing a repair path between a source node and a destination node in a communication network configured to operate a remote Loop-Free Alternate, LFA, procedure. The method comprises the steps of detecting a link failure or switchover event associated with a protected link, within a current path between the source node and the destination node. Next hop information is updated in the PLR node to exclude the PLR node from repair path, and a label withdraw message is sent to a neighbouring node, wherein the label withdraw message informs the neighbouring node of a link failure or switchover event associated with the protected link.

According to another aspect of the present invention there is provided a method in an intermediate node of a communication network for establishing a repair path in response to detecting a link failure or switchover event associated with a protected link, within a current path between a source node and a destination node, wherein the intermediate node is located between a Point of Local Repair, PLR, node and a repair tunnel endpoint node. The method comprises the steps of receiving a label withdraw message from a first neighbouring node, the first neighbouring node being on the PLR node side of the intermediate node. Next hop information of the intermediate node is updated in response to receiving the label withdraw message. The method further comprises the step of sending a label withdraw message to a second neighbouring node, the second neighbouring node being at least one hop further away from the PLR node than the first neighbouring node.

According to another aspect of the present invention, there is provided a node adapted to operate as a Point of Local Repair, PLR, node during establishment of a repair path between a source node and a destination node of a communication network, the communication network being configured to operate a remote Loop-Free Alternate, LFA, procedure. The node comprises a processing unit configured to detect a link failure or switchover event associated with a protected link, within a current path between the source node and the destination node, and update next hop information in the PLR node to exclude the PLR node from repair path. A transmitting unit is configured to send a label withdraw message to a neighbouring node, wherein the label withdraw message informs the neighbouring node of a link failure or switchover event associated with the protected link.

According to another aspect of the present invention, there is provided a node adapted to operate as an intermediate node during establishment of a repair path in response to detecting a link failure or switchover event within a current path between a source node and a destination node, wherein the intermediate node is located between a Point of Local Repair, PLR, node and a repair tunnel endpoint node. The node comprises a receiving unit adapted to receive a label withdraw message from a first neighbouring node, the first neighbouring node being on a PLR node side of the intermediate node. A processing unit is adapted to update next hop information of the intermediate node in response to receiving the label withdraw message. A transmitting unit is adapted to send a label withdraw message to a second neighbouring node, the second neighbouring node being at least one hop further away from the PLR node than the first neighbouring node.

According to another aspect of the present invention, there is provided a computer program product configured to perform the method as defined in any one of the method claims appended hereto.

According to another aspect of the present invention, there is provided an apparatus for establishing a repair path between a source node and a destination node in a communication network configured to operate a remote Loop-Free Alternate, LFA, procedure. The apparatus comprises a storage module storing information relating to a Point of Local Repair, PLR, node, and a repair tunnel endpoint node associated with the PLR node. The apparatus comprises a link failure detection module, the failure occurring within a protected link of a current path between the source node and the destination node. The apparatus comprises an establishment module for establishing a repair path between the source node and the destination node, wherein the repair path is routed via the repair tunnel endpoint node, and wherein the route of the repair path excludes the PLR node and the protected link.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

Figure 3:
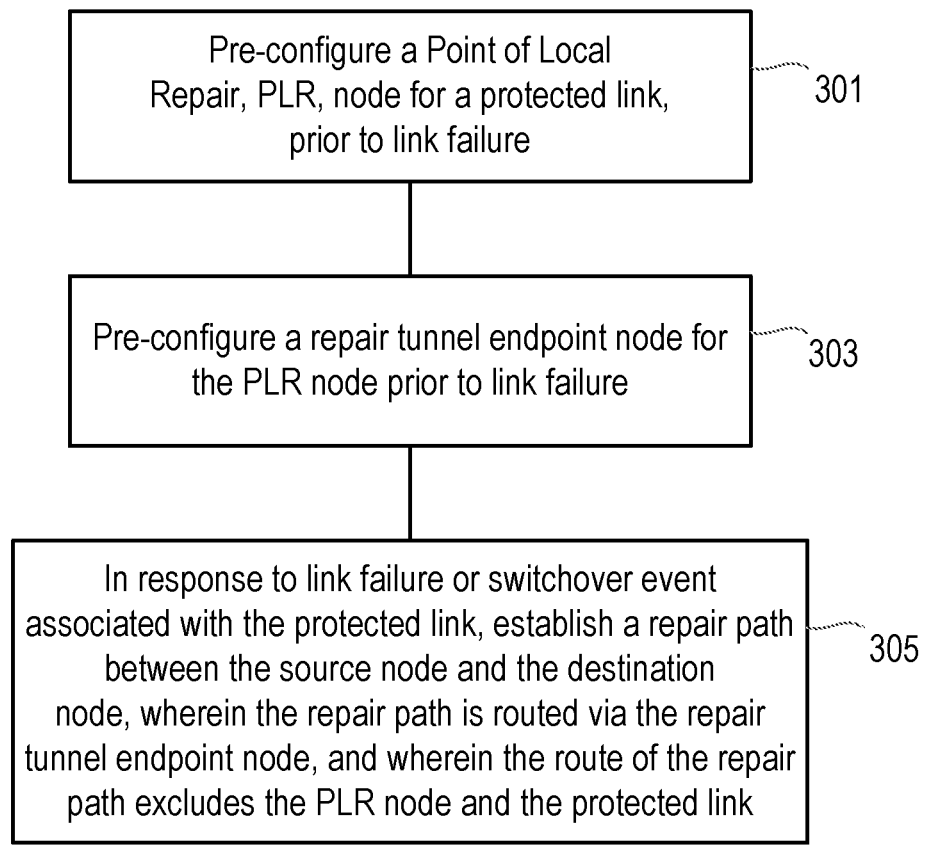
FIG. 3 is a flow chart illustrating the steps of a method according to an embodiment of the present invention.

FIG. 3 shows a method according to an embodiment of the present invention, for establishing a repair path between a source node and a destination node in a communication network configured to operate a remote Loop-Free Alternate, LFA, procedure. Prior to detecting a link failure or switchover event associated with a protected link, within a current path between the source node and the destination node, the method comprises, in step 301, pre-configuring a Point of Local Repair node, i.e. PLR node. Also prior to a link failure or switchover event, in step 303 a repair tunnel endpoint node is preconfigured for the PLR node. In step 305, in response to detecting a link failure or switchover event associated with the protected link, a repair path is established between a source node and a destination node, wherein the repair path is routed via the repair tunnel endpoint node, and wherein the route of the repair path excludes the PLR node and the protected link.

It is noted that a switchover event may be triggered by a degradation of link bandwidth of the protected link, for example, or other factors which require a particular protected link to be avoided and a different route to be used.

Figure 4:
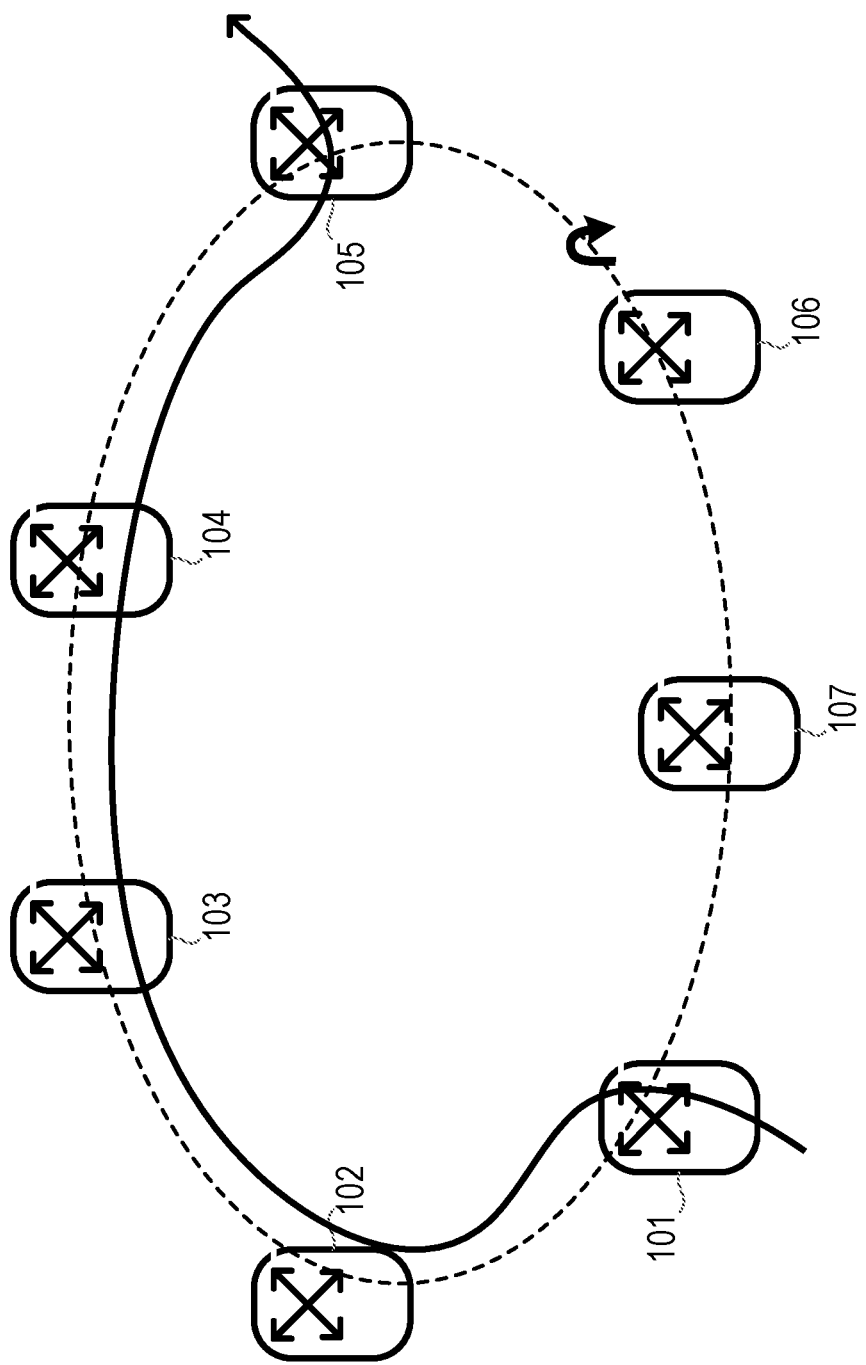
FIG. 4 a block diagram illustrating an example of a communication path formed by an embodiment of the present invention.
Figure 5:
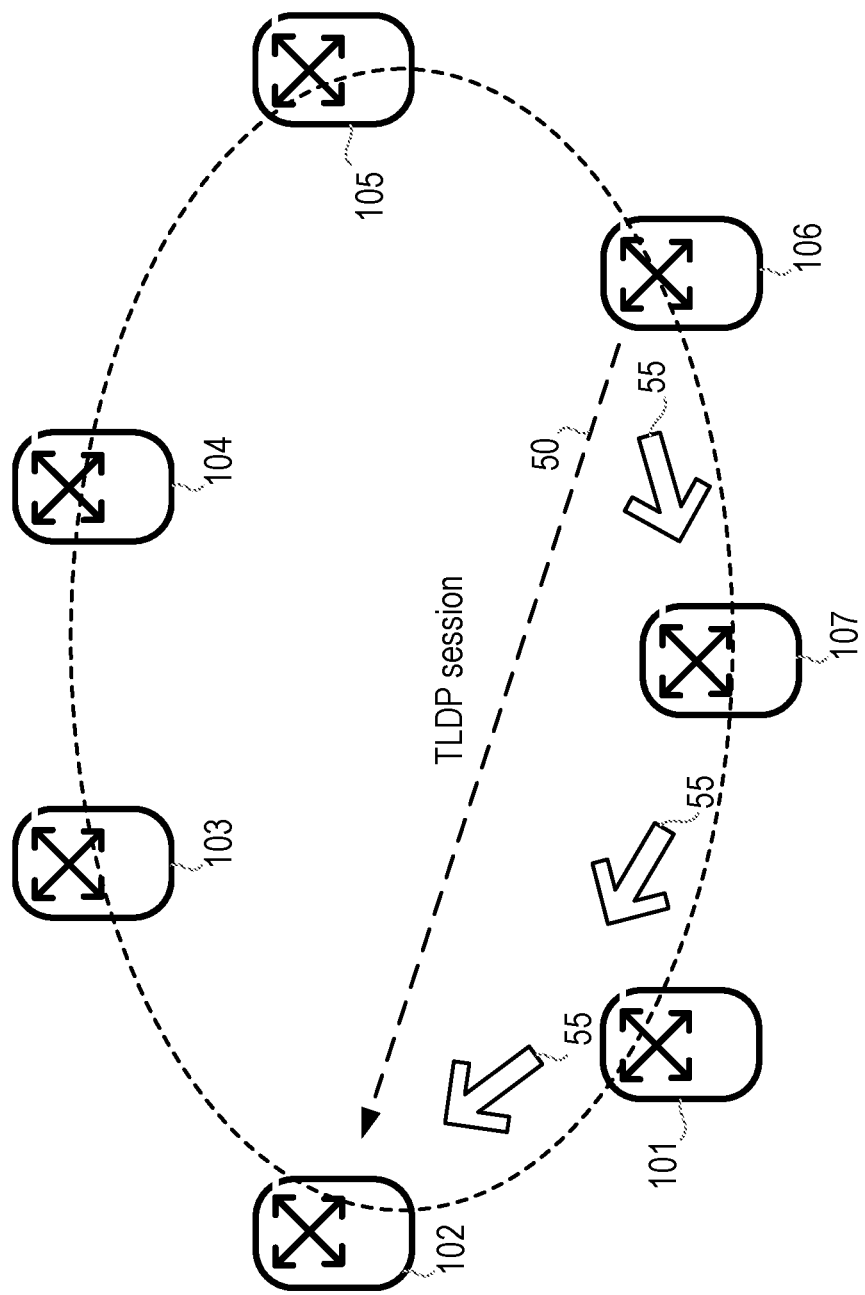
FIG. 5 a block diagram illustrating how a communication path of FIG. 4 may be formed according to an embodiment of the present invention.
Figure 7:
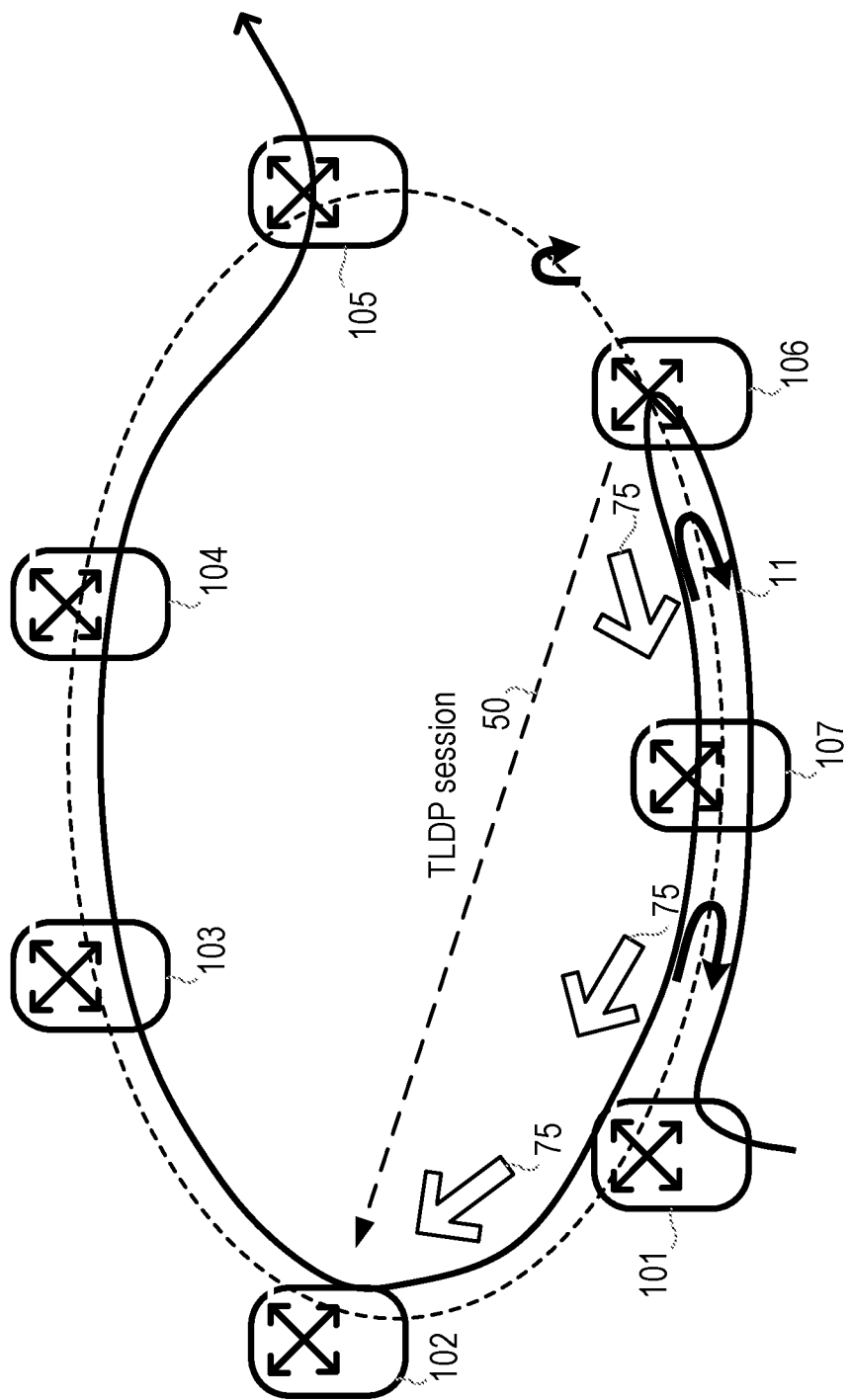
FIG. 7 a block diagram illustrating further how a communication path of FIG. 4 may be formed according to an embodiment of the present invention.
Figure 9:
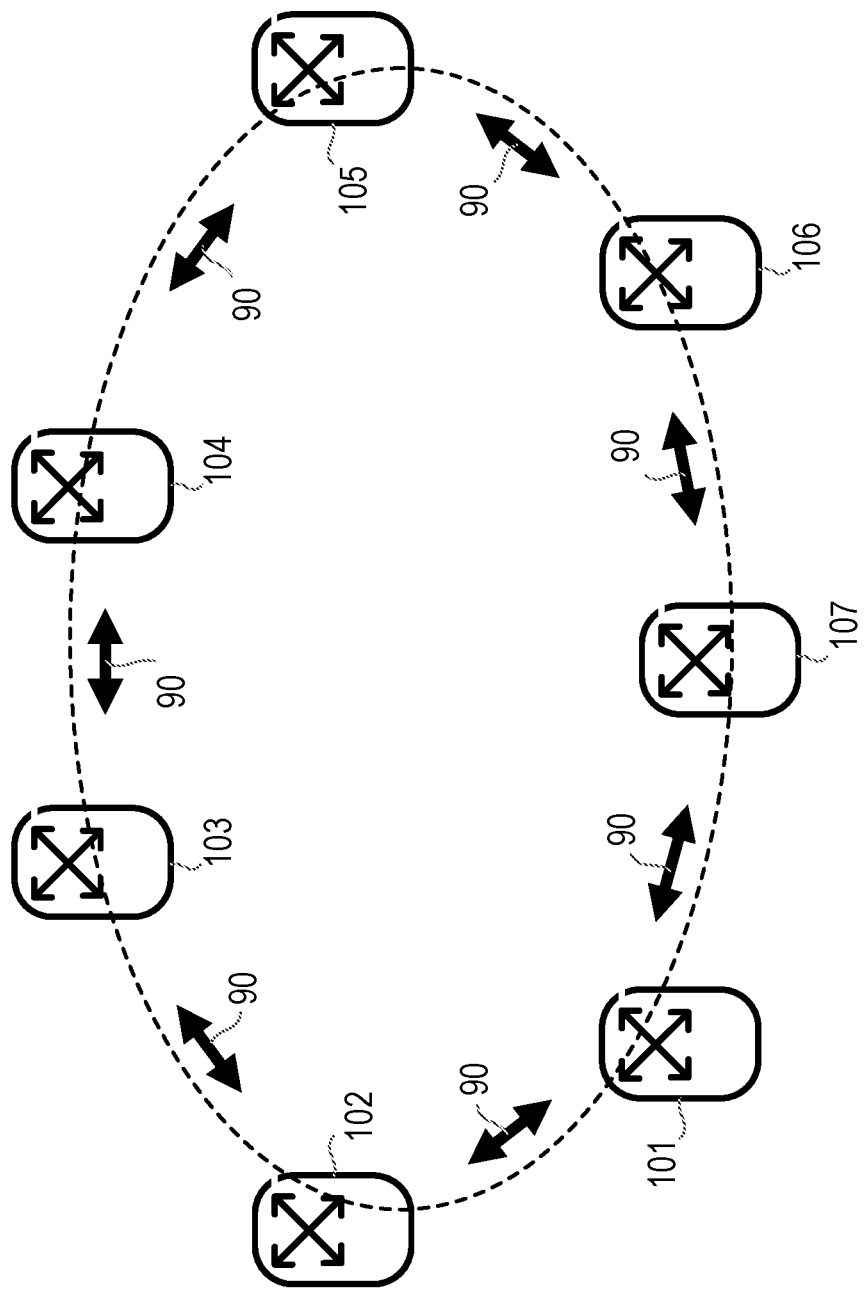
FIG. 9 a block diagram illustrating an advertising procedure according to an embodiment of the present invention.

The method can be explained further in relation to FIG. 4, with FIGS. 5, 7 and 9 providing further details relating to how the repair path may be established according to embodiments of the invention.

Figure 1:
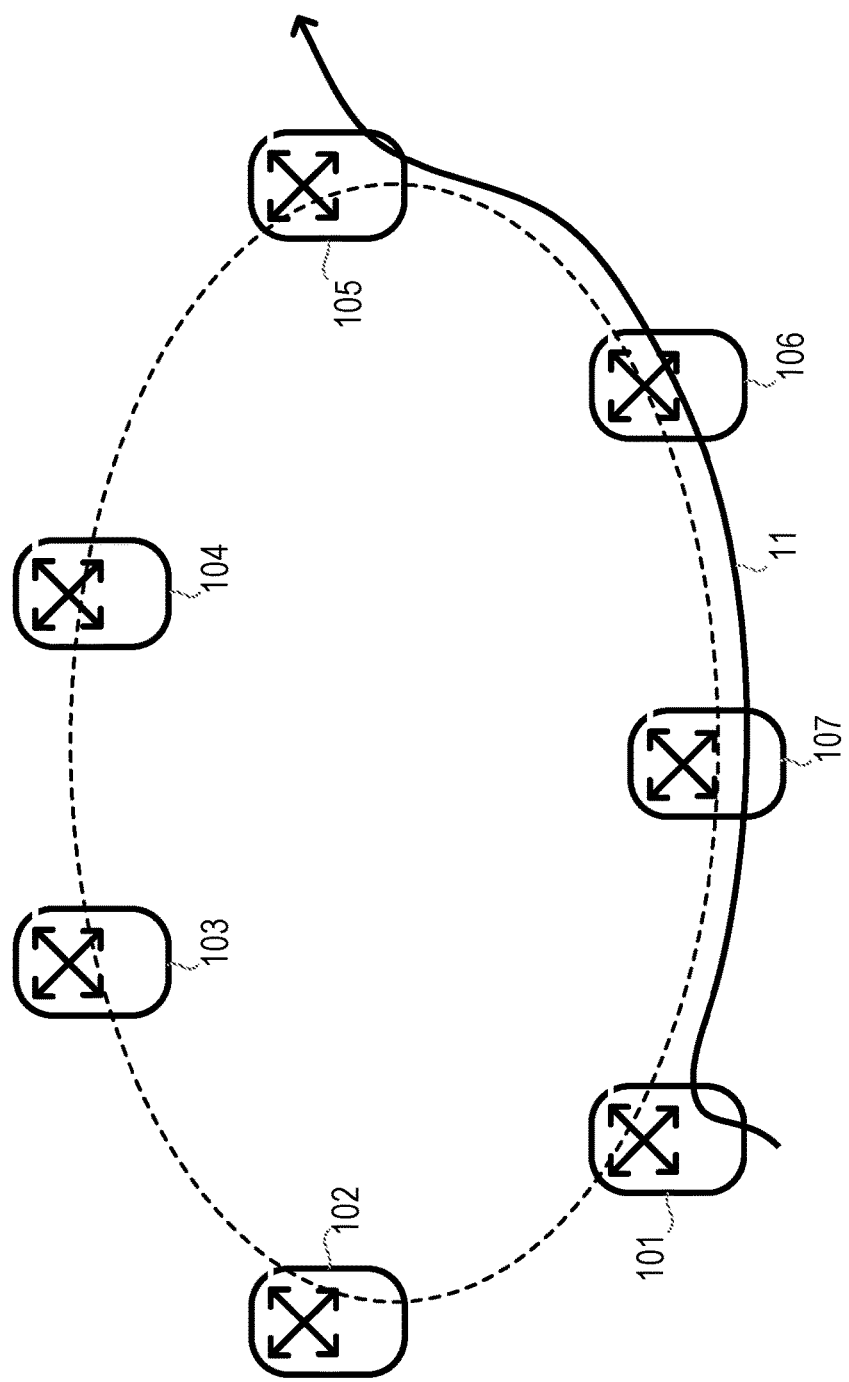
FIG. 1 is a block diagram illustrating an example of a communication path through a communication network.

If it is assumed that a current path (including one or more protected links) is a path between a source node 101 and a destination node 105 (as previously shown in FIG. 1), then, referring to FIG. 4, in response to detecting a link failure or switchover event associated with a protected link, within a current path between the source node 101 and the destination node 105, for example a link failure of the protected link between node 106 and node 105 (or a switchover event associated with that link), the method comprises the step of establishing a repair path between the source node 101 and the destination node 105. The PLR node pre-configured for the protected link between nodes 106 and 105 in this example is node 106, i.e. the point next to the failure. The repair tunnel endpoint node pre-configured for the PLR node 106 in this example is node 102. The repair path is therefore routed via the repair tunnel endpoint node 102, and the route of the repair path excludes the PLR node 106 and the protected link.

Figure 2:
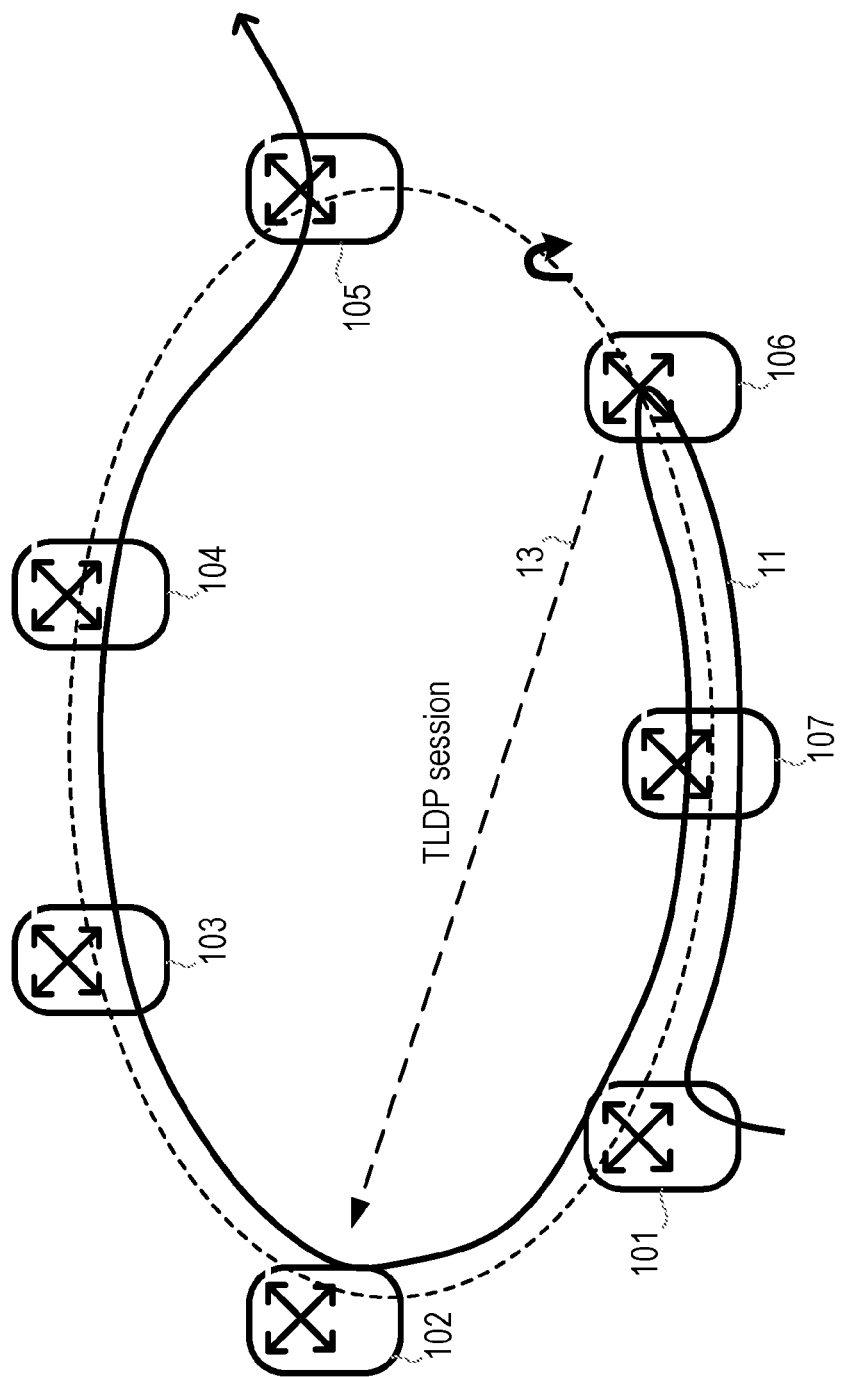
FIG. 2 a block diagram illustrating an example of a communication path following a link failure according to the prior art.

By establishing the repair path directly via the repair tunnel endpoint node 102, and excluding the PLR node 106 itself (for example by including Label Distribution Protocol, LDP, Multi-Topology capability, MT-ID extended label-mapping message advertisement before link failure, and MT-ID extended label-withdraw message advertisement after link failure, as described in further detail below), this means that the LDP convergence can be speeded up, such that a direct path is provided between the source node 101 and the destination node 105. This also has the advantage of avoiding any unnecessary wastage of bandwidth, for example if a loop via the PLR node 106 is used as shown in FIG. 2 according to the prior art.

It can be seen from the above that the step of establishing a repair path further comprises the step of excluding one or more additional nodes (for example node 107 in this example) located between the source node 101 and the PLR node 106 from the route of the repair path. It is noted that more than one additional node may be removed in this way, for example if there happen to be multiple nodes between the source node 101 and the PLR node 106 in a particular example. It will be appreciated that the more nodes that are removed in this manner, then the greater the saving in the use of bandwidth. Thus, in addition to removing the PLR node 106 itself, one or more other nodes may also be removed to avoid the unnecessary loop, and thus provide a direct path between the source node 101 and the destination node 105.

Advantages of this embodiment include a saving in bandwidth, and quickly removing unwanted nodes such that the shortest path is achieved more efficiently, and prior to any global re-routing procedure being carried out (for example prior to an Interior Gateway Protocol, IGP, convergence procedure being carried out).

According to an embodiment of the invention the step of establishing a repair path comprises the steps of sequentially withdrawing the PLR node (e.g. node 106) and the one or more additional nodes (e.g. 107) from the route of the repair path.

FIG. 5 describes some of the pre-configuration steps that can be carried out to assist with the establishment of the repair path. For link protection between node 106 and node 105, then a PLR node will have been pre-configured for that protected link, for example node 106 in this example because it is next to the protected link. A repair tunnel endpoint node associated with this PLR node 106 will have also been pre-configured prior to the link failure or switchover event. In this example the repair tunnel endpoint node is node 102, which may be selected or chosen using conventional techniques. Prior to link failure the PLR node 106 establishes a communication session, for example a temporary LDP communication session 50, with the repair tunnel endpoint node 102, and retrieves label information which is used by the PLR node 106 to create a label mapping message 55. The label information retrieved from the repair tunnel endpoint node 102 relates to node 102's label for the destination node 106. The retrieved label information is stored with a topology unique multi-topology identifier, MT-ID, and encapsulated into a label mapping message 55. The label mapping message therefore comprises an MT-ID which is unique for a particular PLR node. The label mapping message may be communicated between nodes using, for example, an extended LDP capability message. The label mapping message 55 is communicated between nodes, and in particular passed from node to node until it reaches the repair tunnel endpoint node 102 (or PQ node), such that each node can store label mapping information which is to be acted upon following a link failure or switchover event, in order to remove the undesired nodes from the repair path.

Figure 6A:
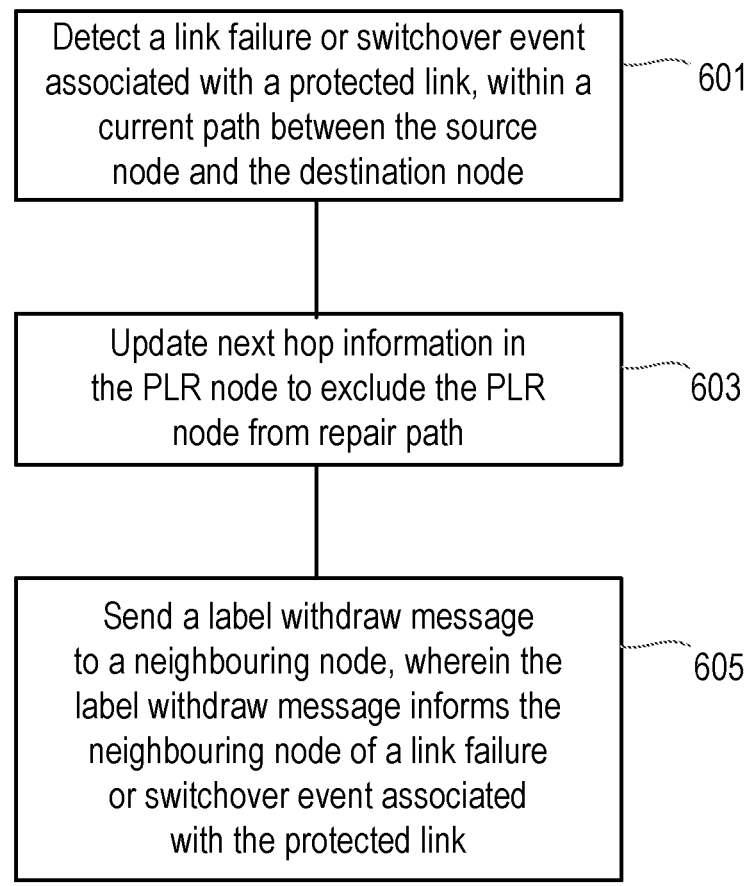
FIGS. 6a and 6b are flow charts illustrating the steps performed at a Point of Local Repair node of a communication network, according to an embodiment of the present invention.

Thus, referring to FIG. 6a the PLR node 106, according to one embodiment, performs steps for establishing a repair path between a source node 101 and a destination node 105 in a communication network configured to operate a remote LFA procedure.

The method performed in the PLR node comprises the steps of detecting a link failure or switchover event associated with a protected link, within a current path between a source node 101 and a destination node 105, step 601. In step 603 next hop information is updated in the PLR node 106 to exclude the PLR node 106 from the repair path. In step 605 a label withdraw message is sent to a neighbouring node, wherein the label withdraw message informs the neighbouring node of a link failure or switchover event associated with the protected link.

Figure 6B:
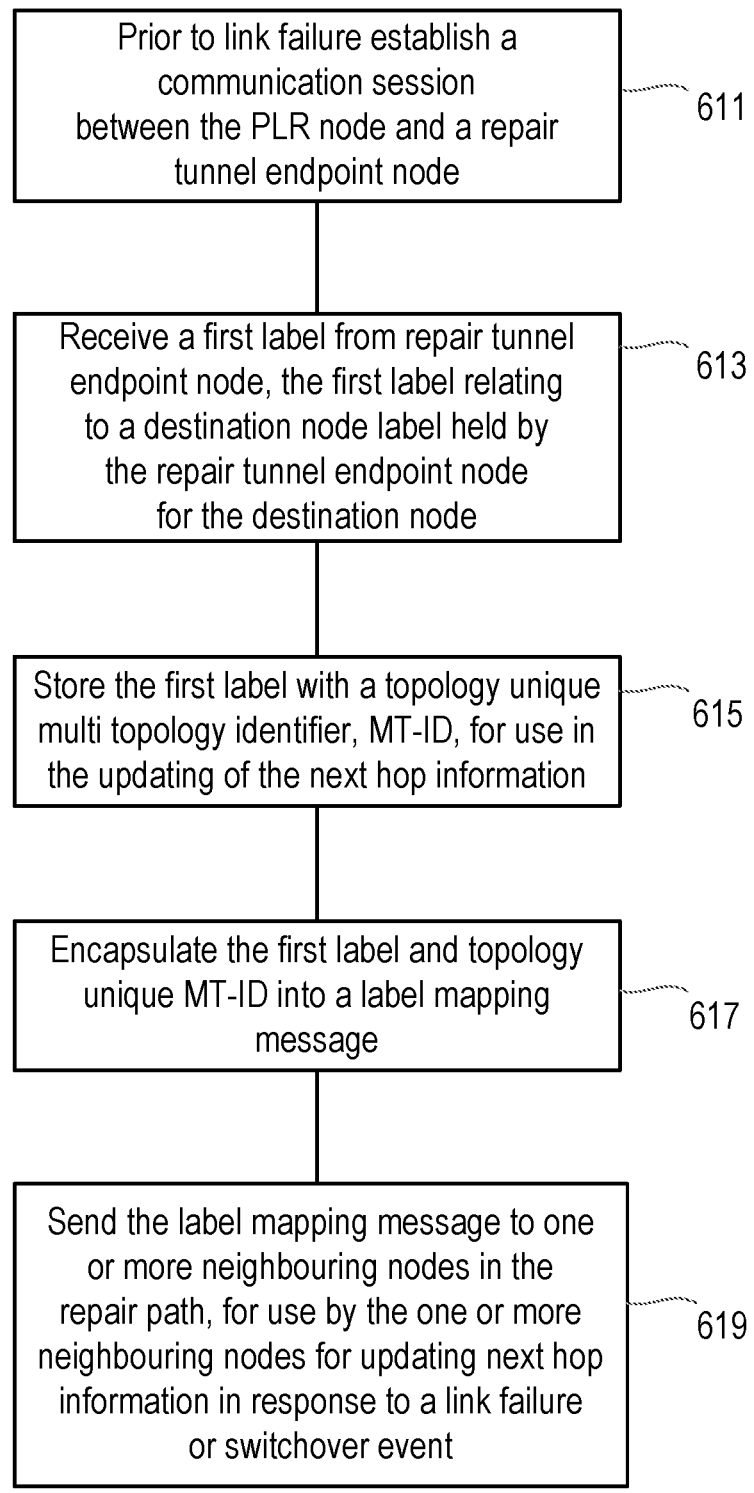

Referring to FIG. 6b, prior to detecting a link failure or switchover event within the current path between the source node 101 and the destination node 105, the PLR node may be configured to perform the following steps.

In step 611 a communication session 50 is established between the PLR node 106 and a repair tunnel endpoint node associated with the PLR node. The repair tunnel endpoint node associated with that PLR node may be pre-configured according to standard RLFA procedures, as defined in IETF RFC5286 or an IETF paper referenced <draft-ietf-rtgwg-remote-lfa-04>. The communication session established between the PLR node and the repair tunnel endpoint node may comprise a targeted label distribution protocol, TLDP, communication session. In step 613 the PLR node receives a first label from the repair tunnel endpoint node, wherein the first label relates to a destination node label held by the repair tunnel endpoint node for the destination node. In other words, the first label received by the PLR node 106 is node 102's label for the destination node 105. The first label is stored with a topology unique multi topology identifier, MT-ID, step 615, for use in the updating of the next hop information. The first label and topology unique MT-ID are encapsulated into a label mapping message, step 617. The label mapping message is sent to one or more neighbouring nodes in the repair path, for use by the one or more neighbouring nodes for updating next hop information in response to a subsequent link failure or switchover event, step 619. The neighbouring nodes are triggered to update their next hop information to the repair path upon receiving a label withdraw message, as explained below.

Referring to FIG. 7, following a link failure or switchover event a label withdraw message 75 may be used to remove one or more other nodes from the repair path, in addition to removal of the PLR node itself. The label withdraw message 75 is communicated from the PLR node 106 to one or more neighbouring nodes, including the repair tunnel endpoint node 102, as shown in FIG. 7.

In this way a label withdraw message 75 is sent from node to node, starting from the PLR node 106, thus removing the PLR node 106 and any unnecessary nodes (such as node 107) from the repair path. The nodes are effectively removed sequentially as shown in FIG. 7. The label withdraw message 75 is passed from the PLR node 106 to node 107, from node 107 to the source node 101, from the source node 101 to the repair tunnel endpoint node 102. The label withdraw message 75 has the effect of changing the next hop information at each node, such that each node effectively blocks packets from proceeding towards the PLR node 106. Each section of the unwanted loop is therefore removed, by pruning node by node, until the direct repair path of FIG. 4 above is obtained.

The PLR node 106 stores the first label with a topology unique multi topology identifier, MT-ID. The first label and topology unique MT-ID are encapsulated into the label mapping message 55. The PLR node sends the label mapping message 55 to a neighbouring node (the neighbouring node being an additional node in a path up to, and including, the repair tunnel endpoint node).

The label mapping message 55 and the label withdraw message 75, which are used, respectively, for advertising the availability of the repair function prior to link failure, and to trigger the repair function after a link failure, will be explained further below.

According to one example a default MT-ID is added into each node's per-Forwarding Equivalence Classes (per-FEC) resource, and shown in Table 1 below. Table 1 shows the per-FEC resource stored in the PLR node 106 for the current path, i.e. the primary path.

TABLE 1

|  | status | Next-hop | Outgoing label | MT-ID |
|---|---|---|---|---|
| FEC 1 (primary) | active | Node 105 | 100 (node 106's label for node 105) | 0 (default) |
| ... | ... | ... | ... | ... |

The primary path is shown as active, with the next hop being node 105 (the destination node in this example), and "100" being node 106's label for node 105. A default value "0" is stored for the Multi-Topology Identifier, MT-ID.

However, as mentioned above the first label received by the PLR node 106 from the repair tunnel endpoint node 102, i.e. node 102's label for the destination node 105, is encapsulated with a topology unique MT-ID to form a label withdraw message, to enable the PLR node and one or more additional nodes to be withdrawn from the repair path.

Table 2 below shows an example of the per-FEC resource that may be stored in the PLR node 106, for enabling the repair path (or backup path) to be established accordingly.

TABLE 2

|  | status | Next-hop | Outgoing label | MT-ID |
|---|---|---|---|---|
| FEC 1 (primary) | active | Node 105 | 100 (node 106's label for node 105) | 0(default) |
| FEC 1 (repair) | inactive | Node 107 | 200 (node 106's label for node 102) | 0(default) |
|  |  |  | 1000 (node 102's label for node 105) | 1 |
| ... | ... | ... | ... | ... |

From Table 2 above it can be seen that each PLR node stores label mapping information, comprising primary path information and repair path information. This label mapping information is formed by the exchange of label mapping messages prior to link failure, and the status of a node is triggered, following link failure, by the receipt of a label withdraw message.

The primary path information comprises:
the identity of the node forming the next hop in a primary path (e.g. for node 106, this will be node 105);
the label of the particular node (PLR node) for the destination node (i.e. node 106's label for node 105, e.g. "100" in the example above); and
a default multi-topology identifier value, MT-ID, the default MT-ID being specific to a PLR node (default value "0" in the example).

The repair path information comprises:
the identity of the node forming the next hop in a predetermined repair path (or back-up path, e.g. node 107 in this example);
the label of the particular node (i.e. PLR node 106) for the repair tunnel endpoint node (i.e. node 106's label for node 102, e.g. "200" in the example), together with an associated default multi-topology identifier value, MT-ID (default value "0" in the example); and
the label of the repair tunnel endpoint node 102 for the destination node 105 (i.e. node 102's label for node 105, e.g. "1000" in the example), together with an associated topology unique multi-topology identifier value, MT-ID ("1" in the example above).

Likewise, the per-FEC resource stored in node 101, for example, is show below in Table 3.

TABLE 3

| | status | Next-hop | Outgoing label | MT-ID |
|---|---|---|---|---|
| FEC 1 (primary) | active | Node 107 | 300 (node 101's label for node 105) | 0(default) |
| FEC 1 (repair) | inactive | Node 102 | 400 (node 101's label for node 102) | 0(default) |
| | | | 1000 (node 102's label for node 105) | 1 |
| ... | ... | ... | ... | ... |

Thus, for node 101 in this example, from Table 3 above it can be seen that the primary path information comprises:
the identity of the node forming the next hop in a primary path (e.g. for node 101, this will be node 107);
the label of the particular node (source node 101) for the destination node (i.e. node 101's label for node 105, e.g. "300" in the example above); and
a default multi-topology identifier value, MT-ID, the default MT-ID being specific to a PLR node (default value "0" in the example).
In Table 3 the repair path information comprises:
the identity of the node forming the next hop in a predetermined repair path (or back-up path, e.g. node 102 in this example);
the label of the particular node (i.e. source node 101) for the repair tunnel endpoint node (i.e. node 101's label for node 102, e.g. "400" in the example), together with an associated default multi-topology identifier value, MT-ID (default value "0" in the example); and
the label of the repair tunnel endpoint node 102 for the destination node 105 (i.e. node 102's label for node 105, e.g. "1000" in the example), together with an associated topology unique multi-topology identifier value, MT-ID ("1" in the example above).

Each node will store this label mapping information, including information for the primary path and the repair path, based on the information which is pre-configured prior to a link failure. The primary path information will be set to "active" when there is no link failure or switchover event, and the repair path information set to "inactive", as shown above in Tables 2 and 3.

Following a link failure or switchover event the PLR node 106 updates its next hop information by performing the steps of:
setting its primary path information to be inactive; and
setting its repair path information to be active.

In addition to changing the status of the primary path and repair path in this way, as mentioned above the PLR node 106 also sends the label withdraw message to a neighbouring node to advertise the link failure.

Thus, when a link failure or switchover event occurs the PLR node 106 will detect that failure, and will set its original primary next-hop and corresponding outgoing label which are stored in the default MT-ID line to inactive, and the pre-calculated repair (backup) path to active. Then, ongoing packets will switch over to the pre-calculated repair forwarding path to the destination as usual. Also, an MT-ID extended label-withdraw message is sent to its neighbor node for advertising the link failure event (or switchover event). The PLR node and one or more intermediate nodes will be sequentially removed from the repair path.

Thus, the primary path per-FEC resource stored in the PLR node 106 is set as inactive, and the repair path per-FEC resource stored in the PLR node 106 is set as active, as shown below in Table 4.

TABLE 4

| | status | Next-hop | Outgoing label | MT-ID |
|---|---|---|---|---|
| FEC 1 (primary) | inactive | Node 105 | 100 (node 106's label for node 105) | 0(default) |
| FEC 1 (repair) | active | Node 107 | 200 (node 106's label for node 102) | 0(default) |
| | | | 1000 (node 102's label for node 105) | 1 |
| ... | ... | ... | ... | ... |

Node 107 and node 101 will follow the same procedure, in turn, when the MT-ID extended label-withdraw message 75 is received. This hop-to-hop prune operation will pass on until it arrives at the repair tunnel endpoint node 102 (the PQ node).

Thus, each of these one or more other nodes are a type of intermediate node of a communication network for establishing a repair path in response to detecting a link failure or switchover event associated with a protected link, within a current path between a source node and a destination node. The one or more intermediate nodes (nodes 107 and 101 in the example) are located between a Point of Local Repair, PLR, node (node 106) and a repair tunnel endpoint node (node 102). As each node sets its repair path to be active (and primary path to be inactive) following receipt of the label withdraw message, this means that each node effectively starts to block packets from passing that node, i.e. because the packets will follow that node's next hop information in its active repair path, rather than proceeding to the "old" next hop of the primary path.

Figure 8:
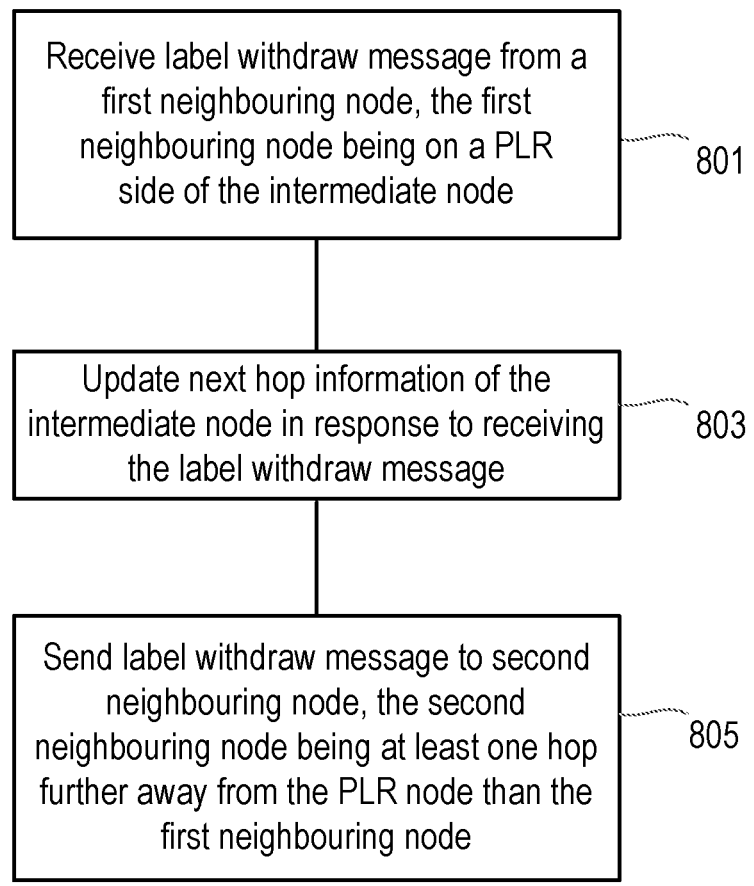
FIG. 8 is a flow chart illustrating the steps performed at a node of a communication network, according to an embodiment of the present invention.

Referring to FIG. 8, the method performed in these one or more intermediate nodes, according to an embodiment of the invention, comprises the steps of receiving a label withdraw message 75 from a first neighbouring node, the first neighbouring node being on the PLR node side of the intermediate node, step 801. Next hop information of the intermediate node is updated in response to receiving a label withdraw message, step 803. The label withdraw message 75 is sent to a second neighbouring node, step 805, the second neighbouring node being at least one hop further away from the PLR node 106 than the first neighbouring node. For example, if the intermediate node is node 107, then the second neighbouring node is node 101, i.e. in the direction towards the repair tunnel endpoint node 102, and one hop further away from the PLR node 106.

The updating step comprises the step of updating the next hop information based on label mapping information previously received in a label mapping message. The label mapping message may comprise, for example, an extended label distribution protocol, LDP, label mapping message.

In an intermediate node the step of updating the next hop information may comprise the steps of:
setting its primary path information to be inactive; and
setting its repair path information to be active.

The intermediate node also sends the label withdraw message to a neighbouring node to advertise the link failure.

In this way the next hop information associated with the intermediate node is updated. The primary path per-FEC resource stored in an intermediate node, for example in the node 101, is set as inactive, and the repair path per-FEC resource stored in the node 101 is set as active, as shown below in Table 5.

TABLE 5

|  | status | Next-hop | Outgoing label | MT-ID |
|---|---|---|---|---|
| FEC 1 (primary) | inactive | Node 107 | 300 (node 107's label for node 105) | 0(default) |
| FEC 1 (repair) | active | Node 102 | 400 (node 107's label for node 102) | 0(default) |
|  |  |  | 1000 (node 102's label for node 105) | 1 |
| ... | ... | ... | ... | ... |

The repair tunnel endpoint node also receives a label withdraw message 75, and will also update the next hop information in this way, i.e. make the primary path information inactive, and the repair path information active. However, the repair tunnel endpoint node does not send the label withdraw message 75 on to any other node, since this is the last node to update its next hop information.

It can be seen from the embodiments described above that Multi-Topology (MT) is added into LDP protocol interaction to extend FEC's corresponding switchover information. For specific destination FEC, the original distributed label will be stored into a default MT-ID associated resource, and the first label (i.e. the label used by repair tunnel endpoint (PQ node) to the destination node) will be stored into a different MT-ID associate resource, unique per PLR node. All of this information may be exchanged by MT-ID extended LDP label-mapping messages before switchover.

When link failure happens (or some other form of switchover event, such as due to link bandwidth degradation), primary path information, including next-hop, outgoing label etc., stored in the default MT-ID associated resource will be set inactive and the repair path will be set to active. Then the prune procedure will be implemented by sending a label withdraw message. The label withdraw message carries a PLR specific MT-ID, for example for node 106 as a PLR, the label withdraw message carries an MT-ID value equal to "1" in the label withdraw message sent to node 107. A direct end-to-end protection path from the packet source node (e.g. node 101) to a destination node (e.g. node 105) is formed after redundant paths are removed from hop to hop.

From the above it can be seen that, before link failure between node 106 and node 105, node 101 and node 107 need to restore node 102's outgoing label for node 105 with corresponding protected FEC. This information is carried and sent by node 106 with a topology unique MT-ID (in the examples herein having a value of "1"). When link failure or a switchover event occurs between node 106 and node 105, a multi-topology extended label withdraw message with that same MT-ID will be sent to advertise that link failure event (or switchover event), and the corresponding inactive resource is triggered into an active status. On the other hand, at a time when node 107 is configured as a PLR node, and the link between node 107 and node 106 needs protection, node 103 will be chosen as a repair tunnel endpoint node, and similar information will come from LDP advertisement originated by node 107 with a topology unique MT-ID (for example an MT-ID having the value "2"). This provides remote LFA detour with an independent endpoint installed for multi-link protection, and node 106 does not need to compute the endpoint for all the nodes, each node chooses their own, which is stored with a different MT-ID.

The per-FEC resource stored in node 101 in such an example is show below in Table 6:

TABLE 6

|  | status | Next-hop | Outgoing label | MT-ID |
|---|---|---|---|---|
| FEC 1 (primary) | active | Node 107 | 300 (node 101's label for node 105) | 0(default) |
| FEC 1 (backup) | inactive | Node 102 | 400 (node 101's label for node 102) | 0(default) |
|  |  |  | 1000 (node 102's label for node 105) | 1 |
| FEC 1 (backup) | inactive | Node 102 | 400 (node 101's label for node 102) | 0(default) |
|  |  |  | 2000 (103's label for node 105) | 2 |

From the above it can be seen that, before link failure or switchover event, FEC related label and unique MT-ID is carried in a label mapping message, the label being stored for packet forwarding, MT-ID is stored for identifying which repair information should be switched to active.

After link failure or switch over event, an FEC related label and the same corresponding MT-ID is carried in the label-withdraw message.

The embodiments above effectively provide a form of loop-free repair path capability mode (i.e. removing the unnecessary loop to the PLR node). This loop-free repair path capability mode may be advertised between nodes of the communication network subsequent to the establishment of a communication session, such that each node knows that this form of improved loop-free repair path establishment is available for use. The loop-free repair path capability mode may be advertised, for example, using a label distribution protocol, LDP, capability message.

FIG. 9 shows how the network may be configured in this way prior to a link failure or switching event occurring. For example, the nodes 101 to 107 in a ring based topology of FIG. 9 advertise the loop-free repair path capability mode, for example as an extended LDP protocol having Multi-Topology capability to the other nodes, using a LDP Capability message 90.

After LDP Multi-Topology capability advertisement in this way, default MT-ID is added into the per-FEC resource of each node, as described in the Tables above.

Figure 13:
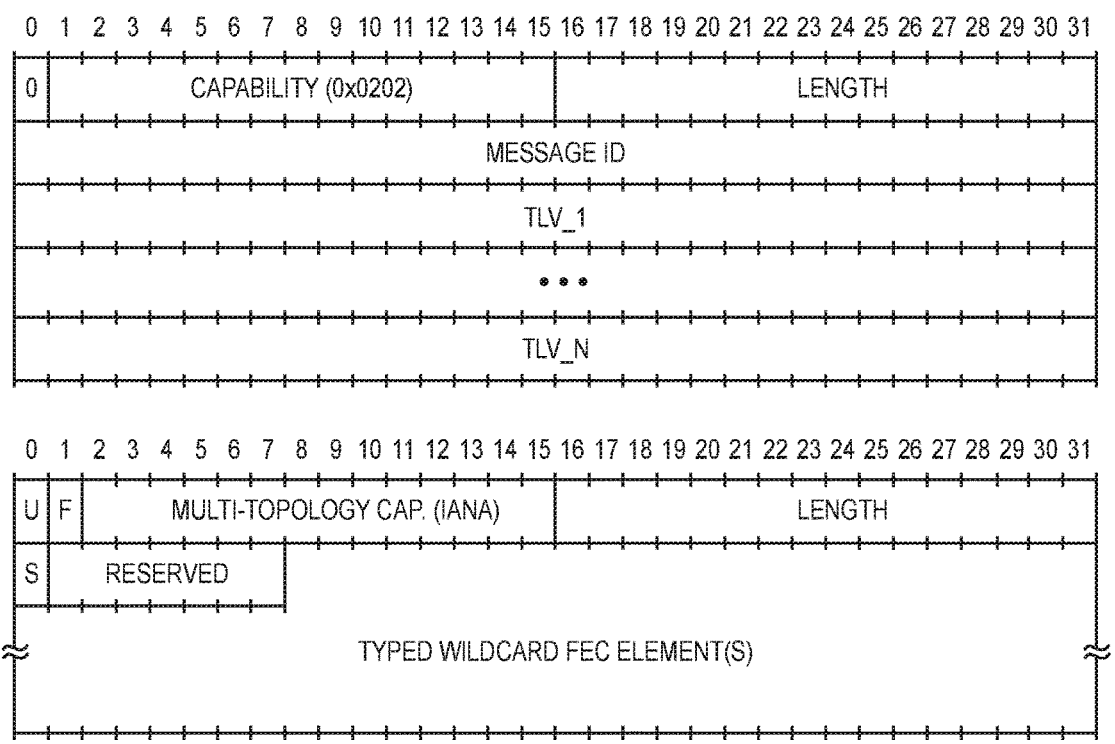
FIG. 13 is a table illustrating a format of an LDP Capability message and Capability Parameter TLV.

The LDP Capability message 90 is used by an LDP speaker to announce changes in the state of one or more of its capabilities subsequent to session establishment. The format of the LDP Capability message 90 and "Capability Parameter" TLV is defined in RFC5561 (LDP Capabilities) and shown in FIG. 13.

Figure 14:
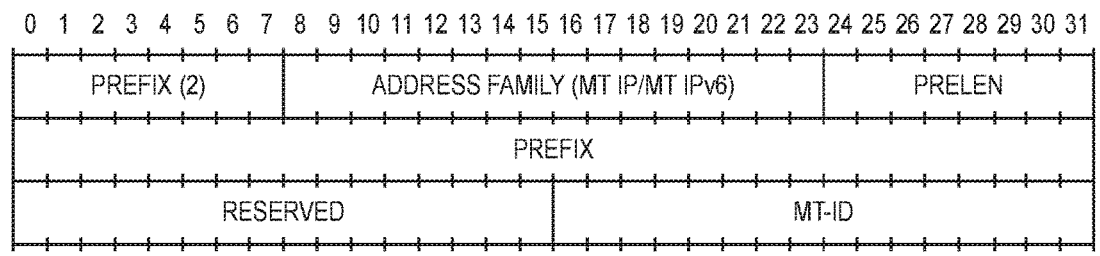
FIG. 14 is a table illustrating an MT Prefix FEC element encoding.

MT Prefix FEC element encoding is defined in <LDP Extensions for Multi Topology Routing draft-ietf-mpls-ldp-multi-topology-11> and shown in FIG. 14.

Figure 15:
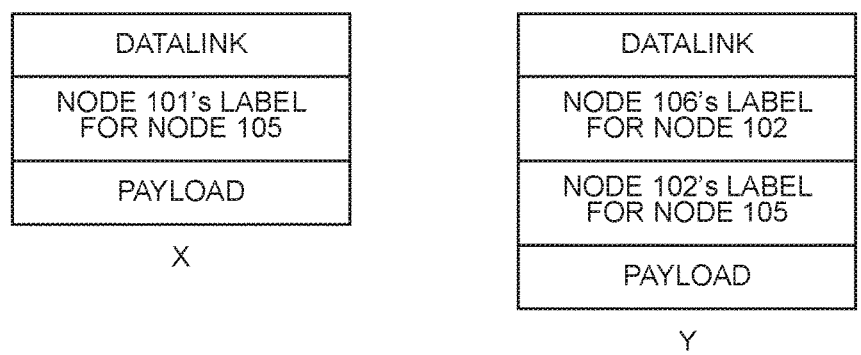
FIG. 15 is a table illustrating the label stack for normal operation and remote LFA operation.

For link protection between node 106 and node 105, node 106 is set as described in the examples above to be the point of local repair (PLR). In order to obtain the remote LFA repair target's label (node 102's label) for the destination (node 105), node 106 needs to establish a targeted LDP session with node 102. The label stack for normal operation and remote LFA operation is the same as <draft-ietf-rtgwg-remote-lfa-04> described and shown in FIG. 15. Label stack X in FIG. 15 is a normal label stack packet arriving at node 101, whereas label stack Y in FIG. 15 is a normal label stack packet leaving node 106, and RLFA label stack to node 105 via node 102 as the remote LFA repair target.

Once the first label (i.e. the repair tunnel endpoint, or remote LFA repair target's label) is obtained by node 106, node 106 will store that label with another different MT-ID and encapsulte into an extended LDP label-mapping message, i.e. the label withdraw message, and then send the label withdraw message to its neighbour node 107. Node 107 will then fetch that information and send this information to the next neighbour using the extended LDP label-mapping message. The hop-to-hop procedure will pass on until it arrives at the repair tunnel endpoint node 102 (i.e. remote LFA endpoint, or PQ node), the label-mapping procedure being as shown in FIG. 5.

After a link failure or switchover event associated with a protected link, a label withdraw message is sent from node to node, as discussed above in FIG. 7.

A direct end-to-end forwarding path is thus formed once the hop-to-hop prune operation is performed, such that packets will follow a much more optimal forwarding path, as shown above in FIG. 4.

Figure 10:
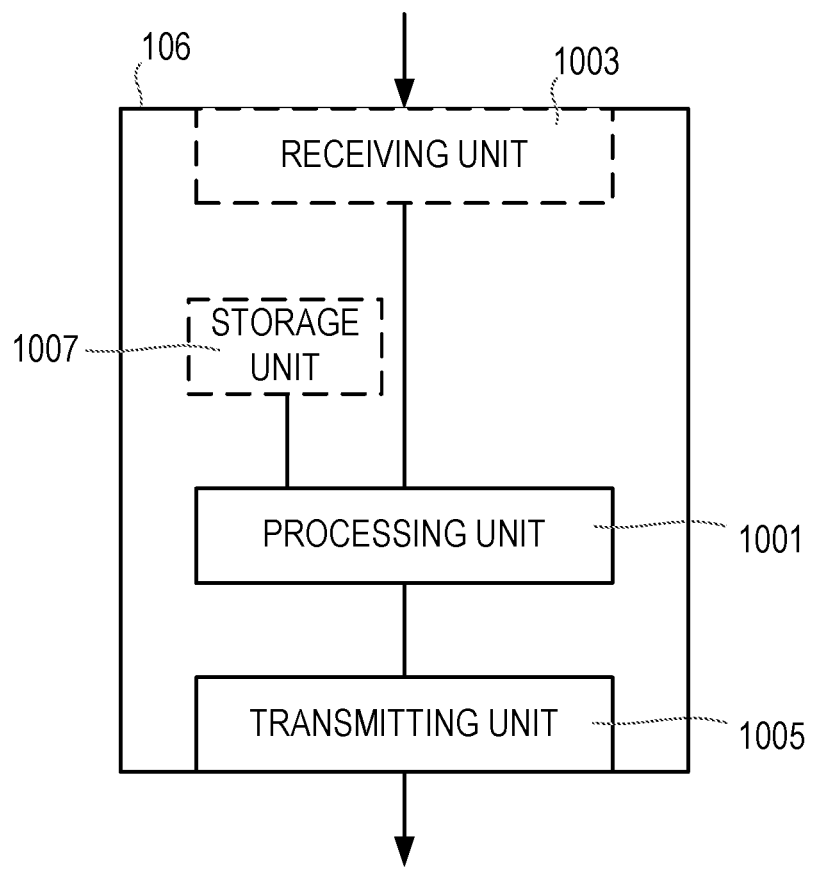
FIG. 10 a block diagram illustrating a Point of Local Repair node according to an embodiment of the present invention.

FIG. 10 shows a node (or terminal) 106 adapted to operate as a point of local repair, PLR, node during establishment of a repair path between a source node (e.g. node 101) and a destination node (e.g. node 105) of a communication network, the communication network being configured to operate a remote loop-free alternate, LFA, procedure. The node 106 comprises a processing unit 1001 configured to detect a link failure or switchover event associated with a protected link, within a current path between the source node and the destination node, and update next hop information in the PLR node 106 to exclude the PLR node 106 from repair path. The node 106 also comprises a transmitting unit 1005 configured to send a label withdraw message to a neighbouring node, wherein the label withdraw message informs the neighbouring node of a link failure or switchover event associated with the protected link.

The node 106 may further comprise a receiving unit 1003 configured to receive a first label from a repair tunnel endpoint node, wherein the first label relates to a destination node label held by the repair tunnel endpoint node for the destination node, and a storage unit 1007 configured to store the first label with a topology unique multi topology identifier, MT-ID, for use in the updating of the next hop information. The processing unit 1001 may be further configured to encapsulate the first label and topology unique MT-ID into a label mapping message. The transmitting unit 1005 may be further configured to send the label mapping message to one or more neighbouring nodes in the repair path, for use by the one or more neighbouring nodes for updating next hop information in response to a link failure or switchover event.

Figure 11:
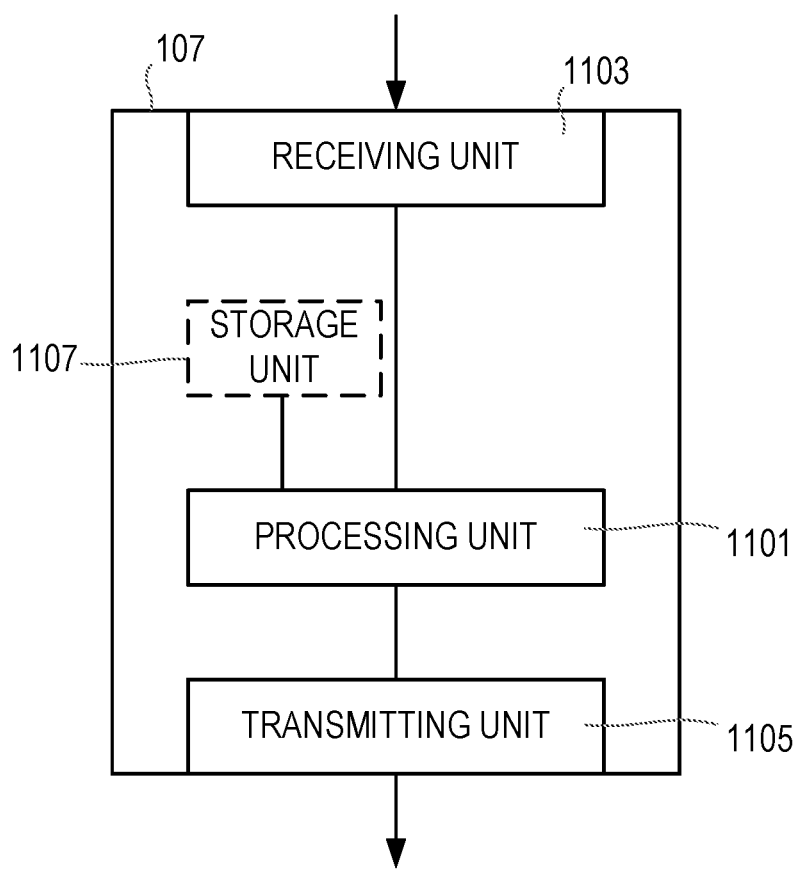
FIG. 11 a block diagram illustrating an intermediate node according to an embodiment of the present invention.

FIG. 11 shows a node (or terminal) 107 according to another embodiment of the invention, adapted to operate as an intermediate node during establishment of a repair path in response to detecting a link failure or switchover event within a current path between a source node and a destination node. The intermediate node is located between a Point of Local Repair, PLR, node (e.g. 106) and a repair tunnel endpoint node (e.g. 102). The intermediate node 107 comprises a receiving unit 1103 adapted to receive a label withdraw message from a first neighbouring node, the first neighbouring node being on a PLR node side of the intermediate node. A processing unit 1101 is adapted to update next hop information of the intermediate node in response to receiving a label withdraw message. A transmitting unit 1105 is adapted to send a label withdraw message to a second neighbouring node, the second neighbouring node being at least one hop further away from the PLR node than the first neighbouring node.

The terminals 106 and 107 shown in FIGS. 10 and 11, respectively, may further comprise a storage unit, 1007 and 1107 respectively. The storage unit is configured to store primary path information and repair path information. The primary path information comprises: the identity of the node forming the next hop in a primary path; the label of the particular node for the destination node; and a default multi-topology identifier value, MT-ID, for the label. The repair path information comprises: the identity of the node forming the next hop in a predetermined repair path; the label of the particular node for the repair tunnel endpoint node, together with an associated default multi-topology identifier value, MT-ID; and the label of the repair tunnel endpoint node for the destination node, together with an associated topology unique multi-topology identifier value, MT-ID.

Following a link failure, each processing unit (1001 or 1101) may be adapted to: set its primary path information to be inactive; and set its back-up path information to be active.

Figure 12A:
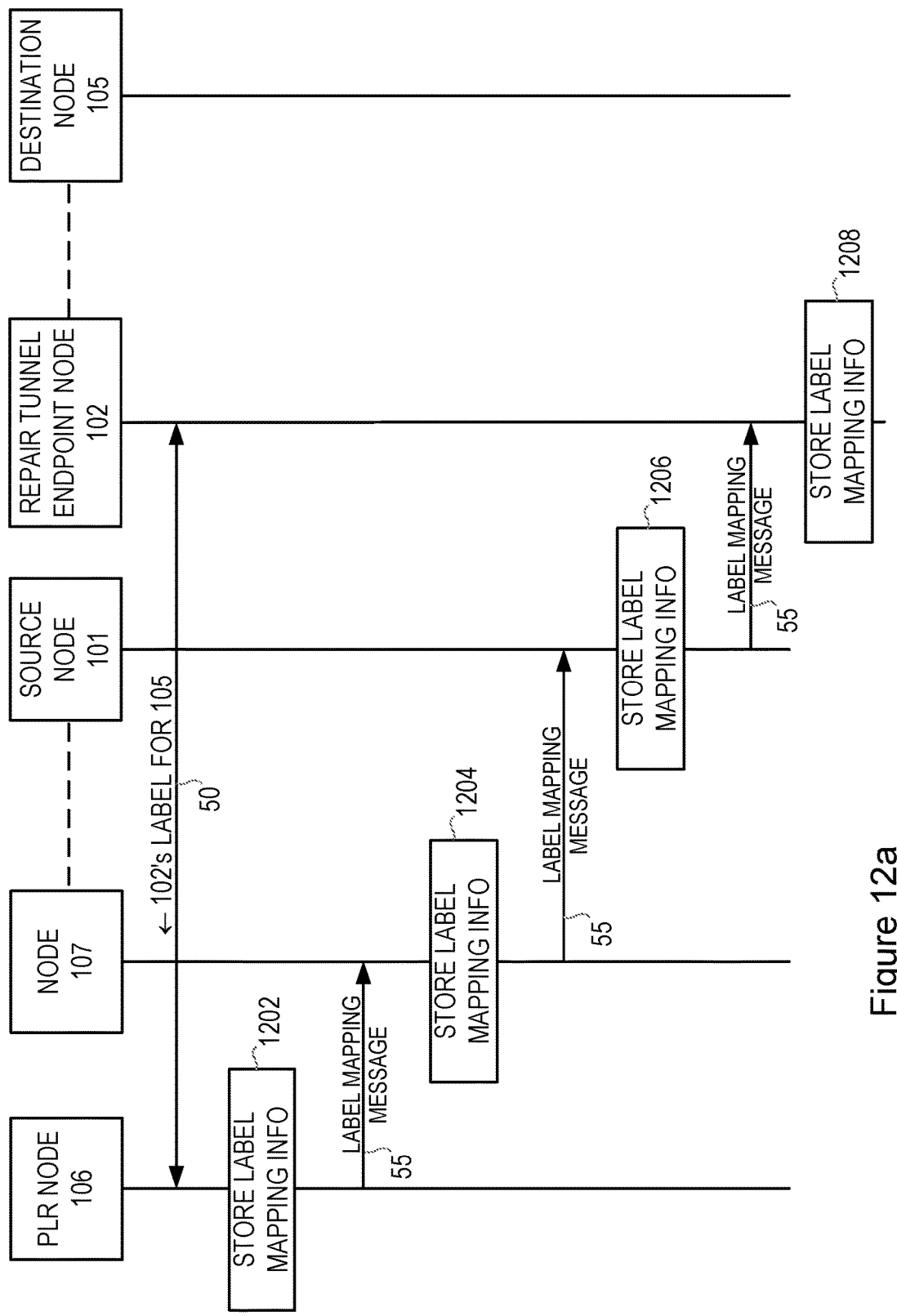
FIGS. 12a, 12b and 12c are signalling diagrams illustrating an exchange of signals in an embodiment of a communication network.
Figure 12B:
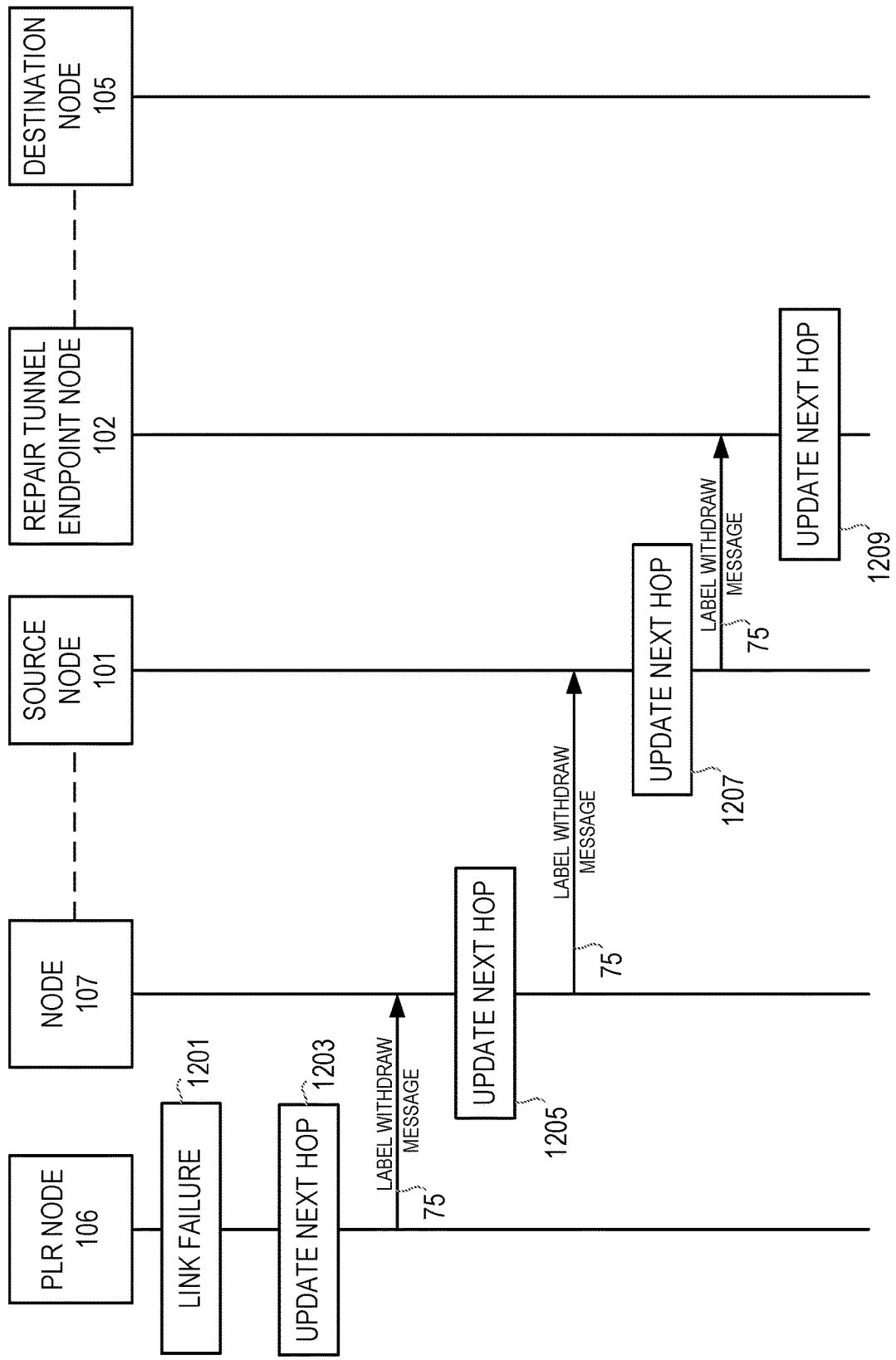
Figure 12C:
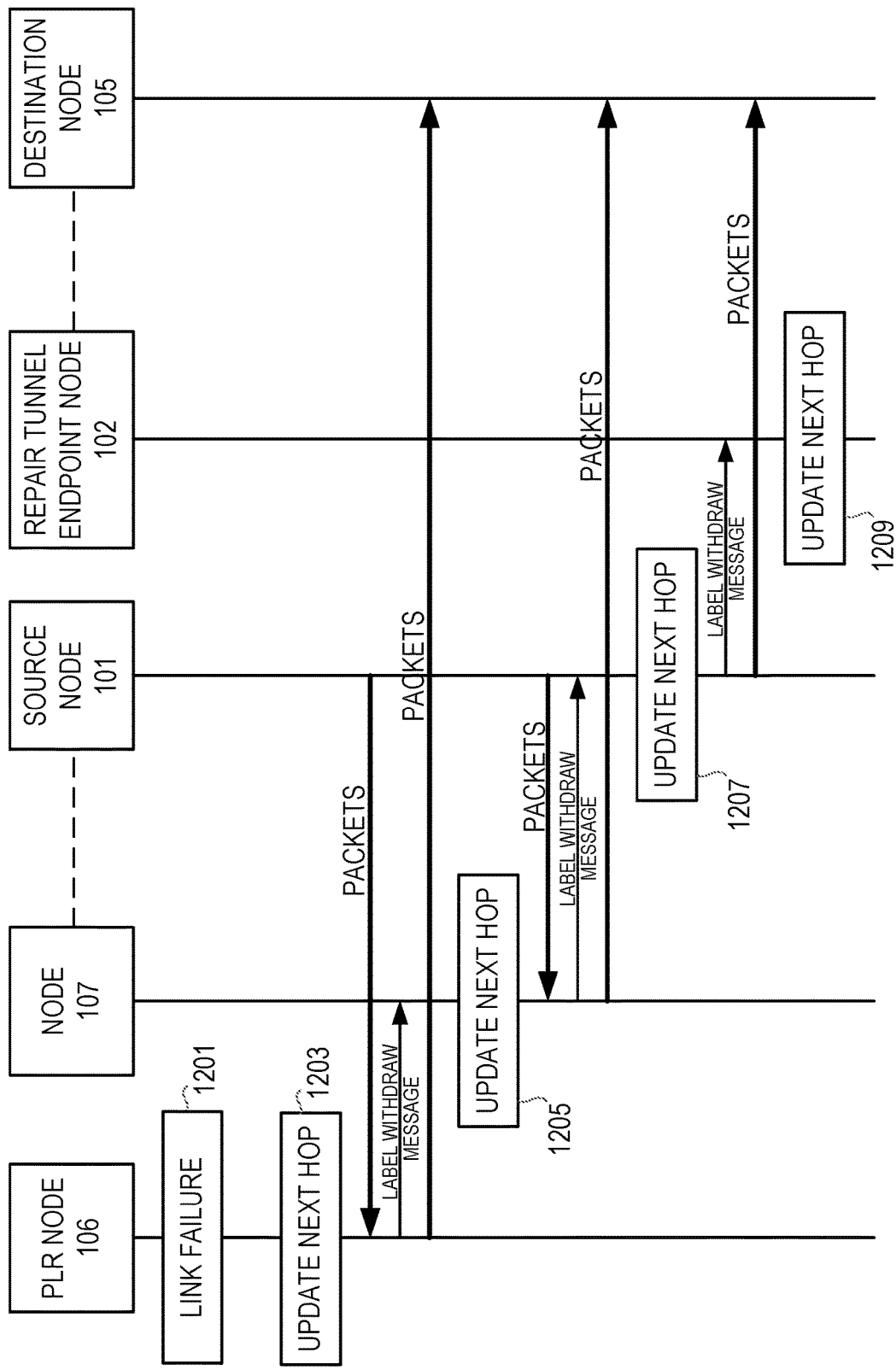

FIGS. 12a, 12b and 12c show signal diagrams of a communication network, having one or more nodes according to embodiments of the present invention.

FIGS. 12a, 12b and 12c show how signals are exchanged between various nodes of the examples described above, and in particular the PLR node 106, the node 107 (acting as an intermediate node), the source node 101 (which also acts as an intermediate node), the repair tunnel endpoint node 102 and the destination node 105. It is noted that one or more other nodes may exist between nodes 102 and 105. Likewise, one or more other nodes may exist between node 107 and 101. It is also noted that other signals and messages may be exchanged between the various nodes, other than the ones referred to below in connection with the establishment of a repair path.

FIG. 12a shows messages that may be communicated prior to a link failure or switchover event. The PLR node 106 establishes a communication session 50 with a repair tunnel endpoint node 102, for example using a TLPD session. In this communication session 50 the PLR node 106 receives a first label, i.e. the label of the repair tunnel endpoint node 102 for the destination node 105. In functional event 1202 the PLR node stores label mapping information, including the label mapping information including the first label and a topology unique MT-ID for that PLR node. The PLR node 106 also encapsulates the first label with a topology unique MT-ID into a label mapping message 55. The label mapping message is sent to a neighbouring node 107. In functional event 1204 the node 107 stores the label mapping information. The node 107 forwards a label mapping message to a neighbouring node, e.g. node 101, and in functional event 1206 the node 101 stores the label mapping information. Node 101 forwards a label mapping message 55 to a neighbouring node, e.g. node 102, and in functional event 1208 the node 102 stores the label mapping information. In this way the label mapping message 55 is sent to one or more neighbouring nodes in the repair path, for use by the one or more neighbouring nodes for updating next hop information (in response to a subsequent link failure or switchover event, and in response to receiving a label withdraw message).

FIG. 12b shows the messages that may be sent following a link failure or switchover event 1201. Upon detecting a link failure or switchover event the PLR node 106 can update its next hop information, functional event 1203, for example by setting its primary path information to inactive, and setting its repair path information to active. This is based on label mapping information previously generated by the PLR node, for example as described in FIG. 12a. The PLR node 106 also sends a label withdraw message 75 to its neighbouring node 107 (the neighbouring node being in the path towards the repair tunnel endpoint node 102). This label withdraw message 75, for example in the form of an extended LDP message having multi-topology identifier, has the effect of advertising a link failure to the neighbouring node. Each unique MT-ID identifier informs a neighbouring node about which next-hop information should be used from its label mapping information.

Upon receipt of the label withdraw message 75, the neighbouring node 107 updates its next hop information, functional event 1205, for example by setting its primary path information to inactive, and setting its repair path information to active. The node 107 also sends a label withdraw message 75 to its neighbouring node 101 (the neighbouring node in the path towards the repair tunnel endpoint node 102). As before, the label withdraw message has the effect of advertising a link failure to the neighbouring node 101.

Upon receipt of the label withdraw message 75, the neighbouring node 101 (which happens to be the source node) updates its next hop information, functional event 1207, for example by setting its primary path information to inactive, and setting its repair path information to active. The node 101 also sends a label withdraw message 75 to its neighbouring node 102 (the neighbouring node in the path towards the repair tunnel endpoint node 102, and in this example the neighbouring node being the actual repair tunnel endpoint node). As before, the label withdraw message has the effect of advertising a link failure to the neighbouring node 102.

Upon receipt of the label withdraw message 75, the neighbouring node 102 (i.e. the repair tunnel endpoint node) updates its next hop information, functional event 1209, for example by setting its primary path information to inactive, and setting its repair path information to active.

In this way the nodes are effectively pruned back, since each node will have repair path information which directs a packet to a next hop which precedes that particular node. As such, any subsequent packets will not go beyond that particular node. For example, once node 107 has set its primary path information to inactive, and its repair path information to active, subsequent packets will not reach the PLR node 106.

This is illustrated in FIG. 12c, whereby packets routed from the source node 101 to the destination node 105 between functional events 1203 and 1205, for example, will be routed via the PLR node 106, whereas once the node 107 has updated its next hop information (i.e. after receiving a label withdraw message 75 from the PLR node 106), then packets from the source node to the destination node between functional events 1205 and 1207 will be routed via node 107, and exclude the PLR node 106. In a similar way, once the node 101 has updated its next hop information (i.e. after receiving a label withdraw message 75 from the node 107), then packets between functional events 1207 and 1209 will be routed directly towards the destination node 105.

The embodiments described herein, comprising Multi-topology combined with a remote LFA procedure, provide a more optimal and flexible mechanism for link failure protection.

The embodiments of the invention also provide LDP Extensions for Multi Topology routing that fully utilize protocol interaction and do not affect existing data plane techniques, since no extra load is involved.

The embodiments of the present invention have advantages over the prior art systems, since they remove the back-and-forth forwarding path that exists between the source node and the PLR node, providing a saving on bandwidth being used, due to the more optimal switchover forwarding path. The embodiments also improve the speed of LDP convergence.

Embodiments of the invention avoid micro loops caused by multi-degradation, since received MT-ID extended label withdraw messages can act as a one-way valve preventing switchover packets turning back again.

It is noted that references in the embodiments described above to a PLR node being pre-configured include, for example, a node being pre-configured according to a network engineering plan to protect a specific link or node.

According to another embodiment, there is provided a computer program product configured to perform the method as defined in any one of the appended claims. It is also noted that one or more of the method steps may be performed in a cloud based environment.

According to another embodiment there is provided an apparatus for establishing a repair path between a source node and a destination node in a communication network configured to operate a remote Loop-Free Alternate, LFA, procedure. The apparatus comprises: a storage module storing information relating to a Point of Local Repair, PLR, node, and a repair tunnel endpoint node associated with the PLR node; a link failure detection module, the failure occurring within a protected link of a current path between the source node and the destination node; and an establishment module for establishing a repair path between the source node and the destination node, wherein the repair path is routed via the repair tunnel endpoint node, and wherein the route of the repair path excludes the PLR node and the protected link.

In the embodiments described above, the method steps may be performed prior to a centralised rerouting convergence procedure being carried out, or prior to a interior gateway protocol, IGP, convergence procedure being carried out. This enables the embodiments of the invention to provide the shortest path before another standard IGP type procedure might be used to provide this.

Although the examples have been described as ring topologies, it is noted that the embodiments of the invention are also applicable to other forms of communication networks.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for establishing a repair path between a source node and a destination node in a communication network configured to operate a remote Loop-Free Alternate (LFA) procedure, the method comprising:
   prior to detecting a link failure or switchover event associated with a protected link within a current path between the source node and the destination node:
      preconfiguring a Point of Local Repair (PLR) node for the protected link; and
      preconfiguring a repair tunnel endpoint node for the PLR node;

in response to detecting a link failure or switchover event associated with the protected link, establishing a repair path between the source node and the destination node;
wherein the repair path is routed via the repair tunnel endpoint node; and
wherein the route of the repair path excludes the PLR node and the protected link;
wherein each node in a communication path stores label mapping information comprising:
primary path information comprising:
an identity of a node forming the next hop in a primary path;
a label of a particular PLR node for the destination node; and
a PLR node-specific default multi-topology identifier value (MT-ID); and
repair path information comprising:
an identity of a node forming the next hop in the repair path;
a label of a particular PLR node for the repair tunnel endpoint node, together with an associated default MT-ID; and
a label of the repair tunnel endpoint node for the destination node, together with an associated topology unique MT-ID.

2. The method of claim 1, wherein the establishing the repair path comprises excluding one or more additional nodes located between the source node and the PLR node from the route of the repair path.

3. The method of claim 2, wherein the establishing the repair path comprises sequentially withdrawing the PLR node and the one or more additional nodes from the route of the repair path.

4. The method of claim 1:
further comprising, prior to a link failure or switchover event communicating a label mapping message between nodes of the communication network;
wherein the label mapping message comprises a multi-topology identifier (MT-ID) which is unique for a particular PLR node.

5. The method of claim 4, wherein the communicating the label mapping message comprises communicating the label mapping message using a label distribution protocol (LDP) capability message.

6. The method of claim 1, wherein the method is performed prior to a centralized rerouting convergence procedure being carried out, or prior to an interior gateway protocol convergence procedure being carried out.

7. A method, in a Point of Local Repair (PLR) node, for establishing a repair path between a source node and a destination node in a communication network configured to operate a remote Loop-Free Alternate (LFA) procedure, the method comprising:
establishing a communication session between the PLR node and a repair tunnel endpoint node associated with the PLR node;
receiving a first label from the repair tunnel endpoint node, wherein the first label relates to a destination node label, held by the repair tunnel endpoint node, for the destination node;
storing the first label with a topology unique multi-topology identifier (MT-ID) for use in updating next hop information;
encapsulating the first label and topology unique MT-ID into a label mapping message;
sending the label mapping message to one or more neighboring nodes in the repair path for use by the one or more neighboring nodes in updating next hop information responsive to a link failure or switchover event;
detecting a link failure or switchover event associated with a protected link within a current path between the source node and the destination node;
updating next hop information in the PLR node to exclude the PLR node from the repair path; and
sending a label withdraw message to a neighboring node, wherein the label withdraw message informs the neighboring node of the link failure or switchover event associated with the protected link.

8. The method of claim 7, wherein the label mapping message comprises an extended label distribution protocol (LDP) label mapping message.

9. The method of claim 7:
wherein following a link failure or switchover event, the updating next hop information in the PLR node comprises:
setting the PLR node's primary path information to be inactive; and
setting PLR node's repair path information to be active.

10. A method, in an intermediate node of a communication network, for establishing a repair path in response to detecting a link failure or switchover event associated with a protected link within a current path between a source node and a destination node; wherein the intermediate node is located between a Point of Local Repair (PLR) node and a repair tunnel endpoint node, the method comprising:
receiving a label withdraw message from a first neighboring node, the first neighboring node being on the PLR node side of the intermediate node;
updating next hop information of the intermediate node in response to receiving the label withdraw message; and
sending a label withdraw message to a second neighboring node, the second neighboring node being at least one hop further away from the PLR node than the first neighboring node;
wherein each node in a communication path stores label mapping information comprising:
primary path information comprising:
an identity of a node forming the next hop in a primary path;
a label of a particular PLR node for the destination node; and
a PLR node-specific default multi-topology identifier value (MT-ID); and
repair path information comprising:
an identity of a node forming the next hop in the repair path;
a label of a particular PLR node for the repair tunnel endpoint node, together with an associated default MT-ID; and
a label of the repair tunnel endpoint node for the destination node, together with an associated topology unique MT-ID.

11. The method of claim 10, wherein the updating comprises updating the next hop information based on label mapping information previously received in a label mapping message.

12. The method of claim 10:
wherein the updating the next hop information comprises:
setting the primary path information to be inactive; and
setting the repair path information to be active.

13. A node adapted to operate as a Point of Local Repair (PLR) node during establishment of a repair path between a source node and a destination node of a communication network, the communication network being configured to operate a remote loop-free alternate (LFA) procedure, wherein the node comprises:
 a receiving circuit configured to receive a first label from a repair tunnel endpoint node, wherein the first label relates to a destination node label held by the repair tunnel endpoint node for the destination node;
 a storage circuit configured to store the first label with a topology unique multi-topology identifier (MT-ID) for use in updating next hop information;
 processing circuitry configured to:
  encapsulate the first label and topology unique MT-ID into a label mapping message;
  detect a link failure or switchover event associated with a protected link within a current path between the source node and the destination node, and
  update next hop information in the PLR node to exclude the PLR node from repair path; and
 a transmitting circuit configured to:
  send the label mapping message to one or more neighboring nodes in the repair path for use by the one or more neighboring nodes for updating next hop information in response to a link failure or switchover event;
  send a label withdraw message to a neighboring node, wherein the label withdraw message informs the neighboring node of the link failure or switchover event associated with the protected link.

14. A node adapted to operate as an intermediate node during establishment of a repair path in response to detecting a link failure or switchover event within a current path between a source node and a destination node, wherein the intermediate node is located between a Point of Local Repair (PLR) node and a repair tunnel endpoint node, the node comprising:
 a receiving circuit configured to receive a label withdraw message from a first neighboring node, the first neighboring node being on a PLR node side of the intermediate node;
 processing circuitry configured to update next hop information of the intermediate node in response to receiving the label withdraw message; and
 a transmitting circuit configured to send a label withdraw message to a second neighboring node, the second neighboring node being at least one hop further away from the PLR node than the first neighboring node;
 a storage circuit configured to store label mapping information comprising:
  primary path information comprising:
   an identity of a node forming the next hop in a primary path;
   a label of a particular PLR node for the destination node; and
   a PLR node-specific default multi-topology identifier value (MT-ID); and
  repair path information comprising:
   an identity of a node forming the next hop in a predetermined repair path;
   a label of a particular PLR node for a repair tunnel endpoint node, together with an associated default MT-ID; and
   a label of the repair tunnel endpoint node for the destination node, together with an associated topology unique MT-ID.

15. The node of claim 14 wherein the processing circuitry is configured to, following a link failure:
 set the node's primary path information to be inactive; and
 set the node's back-up path information to be active.

16. A non-transitory computer readable medium storing a computer program product for establishing a repair path between a source node and a destination node in a communication network configured to operate a remote Loop-Free Alternate (LFA) procedure, the computer program product comprising software instructions which, when run on one or more processors of the communication network, causes the communication network to:
 prior to detecting a link failure or switchover event associated with a protected link within a current path between the source node and the destination node:
  preconfigure a Point of Local Repair (PLR) node for the protected link; and
  preconfigure a repair tunnel endpoint node for the PLR node;
 in response to detecting a link failure or switchover event associated with the protected link, establish a repair path between the source node and the destination node;
 wherein the repair path is routed via the repair tunnel endpoint node; and
 wherein the route of the repair path excludes the PLR node and the protected link;
 wherein each node in a communication path stores label mapping information comprising:
  primary path information comprising:
   an identity of a node forming the next hop in a primary path;
   a label of a particular PLR node for the destination node; and
   a PLR node-specific default multi-topology identifier value (MT-ID); and
  repair path information comprising:
   an identity of a node forming the next hop in the repair path;
   a label of a particular PLR node for the repair tunnel endpoint node, together with an associated default MT-ID; and
   a label of the repair tunnel endpoint node for the destination node, together with an associated topology unique MT-ID.

17. An apparatus for establishing a repair path between a source node and a destination node in a communication network configured to operate a remote Loop-Free Alternate (LFA) procedure, the apparatus comprising:
 processing circuitry;
 memory containing instructions executable by the processing circuitry whereby the processing circuitry is operative to function as:
  a storage module storing information relating to a Point of Local Repair (PLR) node, and a repair tunnel endpoint node associated with the PLR node;
  a link failure detection module for detecting a link failure occurring within a protected link of a current path between the source node and the destination node; and
  an establishment module for establishing a repair path between the source node and the destination node, wherein the repair path is routed via the repair tunnel endpoint node, and wherein the route of the repair path excludes the PLR node and the protected link;
 wherein each node in a communication path stores label mapping information comprising:
  primary path information comprising:

an identity of a node forming the next hop in a primary path;
a label of a particular PLR node for the destination node; and
a PLR node-specific default multi-topology identifier value (MT-ID); and repair path information comprising:
an identity of a node forming the next hop in the repair path;
a label of a particular PLR node for the repair tunnel endpoint node, together with an associated default MT-ID; and
a label of the repair tunnel endpoint node for the destination node, together with an associated topology unique MT-ID.

* * * * *